(12) United States Patent
Mulcahy et al.

(10) Patent No.: US 6,274,851 B1
(45) Date of Patent: Aug. 14, 2001

(54) ELECTRIC ARC FURNACE CONTROLLER

(75) Inventors: Joseph A. Mulcahy, Brooklin; Dawit Tadesse, Mississauga; Janos Rajda, Mississauga; Hassan Ali Kojori, Mississauga, all of (CA)

(73) Assignee: Inverpower Controls Ltd., Burlington ( * ) Notice: Subject to any disclaimer, the term of this patent is extended or adjusted under 35 U.S.C. 154(b) by 0 days.

(21) Appl. No.: 09/386,461

(22) Filed: Aug. 31, 1999

(51) Int. Cl.$^7$ .................................................. H05B 1/02
(52) U.S. Cl. .................... 219/501; 219/497; 219/506; 373/18; 373/135; 323/205; 323/235
(58) Field of Search ..................... 219/501, 497, 219/494, 503, 506; 373/18–22, 135; 323/205–207, 235

(56) References Cited

U.S. PATENT DOCUMENTS

| | | |
|---|---|---|
| 3,936,727 | 2/1976 | Kelly, Jr. et al. . |
| 3,989,999 | 11/1976 | Thompson et al. . |
| 3,999,117 | * 12/1976 | Gyugyi et al. ...................... 219/108 |
| 4,121,150 | * 10/1978 | Kelly, Jr. .............................. 323/102 |
| 4,463,653 | 8/1984 | Pusch et al. . |
| 4,698,581 | 10/1987 | Shimamura et al. . |
| 5,032,738 | 7/1991 | Vithayathil . |
| 5,155,740 | 10/1992 | Ao et al. . |
| 5,239,554 | 8/1993 | Gensini et al. . |
| 5,315,527 | 5/1994 | Beckwith . |
| 5,406,581 | 4/1995 | Staib et al. . |
| 5,438,588 | 8/1995 | Wanner . |
| 5,583,883 | 12/1996 | Paulsson et al. . |

OTHER PUBLICATIONS

W.E. Staib et al., "Neural Network Conversion of the Electric Arc Furnace into the Intelligent Arc Furnce", 1991, pp. 749–756.

Laszlo Gyugyi, et al., American Power Conference, "Static Shunt Compensation for Voltage Flicker Reduction and Power Factor Correction", 1976, vol. 38, pp. 1271–1286.

L. Gyugyi et al., IEEE Transactions on Power Apparatus and Systems, "Principles and Applications of Static, Thyristor--Controlled Shunt Compensators", vol. PAS–97, No. 5, Sep./Oct. 1978, pp. 1935–1945.

J.J. Trageser, IEEE Transactions on Industry Applications, "Power Usage and Electrical Circuit Analysis for Electric Arc Furnaces", vol. 1A–16, No. 2, Mar./Apr. 1980, pp. 277–284.

Janos Rada, et al., "Inverpower Smart Predictive Line Controller, SPLC—Installation Description, Operating Experience, Utility and Production Benefits", pp. 1–8.

Shashi B. Dewan, et al., "Application of 46kV, 100MVA Smart Predictive Line Controller (SPLC) to Ac Electric ArC Furnace", pp. 1–5.

* cited by examiner

*Primary Examiner*—Mark Paschall
(74) *Attorney, Agent, or Firm*—Gowling Lafleur Henderson LLP

(57) ABSTRACT

An electric arc furnace includes a container for receiving metal, an electrode spaced apart from the container, and an electrical power source coupled to the electrode and the container for generating an electrical discharge between the electrode and the container for melting the metal in the container. The arc furnace includes a flicker controller for reducing flicker induced in the power source by the electric arc furnace. The flicker controller consists of a switch electrically connected between the power source and the electrode, and a control system coupled to the switch. The switch includes a gating input for controlling a conduction interval of the switch, and the control system applies gating signals to the gating input for maintaining a magnitude of reactive current flow through the arc furnace substantially constant.

27 Claims, 8 Drawing Sheets

ELECTRIC ARC FURNACE CONTROLLER

FIELD OF THE INVENTION

This present invention relates in general to electric arc furnaces. In particular, the present invention relates to a method and apparatus for reducing flicker in power lines when supplying an electric arc furnace.

BACKGROUND OF THE INVENTION

Electric arc furnaces are well known for melting scrap metal for recycling purposes. An arc furnace typically comprises a container for receiving a scrap metal charge, electrodes spaced a distance from the container, and an electrical power source coupled to the electrodes. The power source induces an electrical discharge between the electrode and the metal charge which produces sufficient heat energy to melt the metal charge.

One common problem associated with electric arc furnaces is that the furnace can produce voltage and current disturbances in the power supply network which supplies the arc furnace. This phenomenon, often called "flicker", arises from large erratic fluctuations in reactive load current through the arc furnace at frequencies up to 25 Hz. When flicker is severe, it can impact on the proper operation of sensitive process loads having a point of common coupling with the arc furnace. Further, due to the sensitivity of the human eye, flicker levels which may not have an impact upon process loads may produce annoying fluctuations in incandescent and fluorescent lamp luminescent levels. Accordingly, North American IEEE and international IEC standards of power quality have been established for flicker and harmonic emission levels acceptable for process loads and incandescent and fluorescent lamps.

Systems have been proposed to compensate for the erratic reactive current swings of the typical arc furnace. In one such system, proposed by L. Gyugyi and R. H. Otto in "Principles and Applications of Static, Thyristor-Controlled Shunt Compensators", IEEE Transactions on Power Apparatus and Systems, Vol. PAS-97, No. 5, September/October 1978, a shunt-type VAR generator is used to reduce flicker by introducing reactive currents into the load current to cancel the reactive components of the load current. Each leg of the VAR generator comprises a fixed capacitor in parallel with a thyristor-controlled fixed inductor, and the conduction angle of the thyristor is varied in response to the magnitude of measured reactive load current. However, as the thyristors are positioned in parallel with the power source and the load, it is difficult to control the magnitude of the load current. Therefore, there remains a need for an electric arc furnace which allows the user to control the operating temperature of the furnace without having a deleterious impact on power quality.

SUMMARY OF THE INVENTION

According to the present invention, there is provided an arc furnace flicker controller which addresses the problems associated with the conventional arc furnace flicker controllers.

The flicker controller, in accordance with the present invention, reduces flicker induced by an electric arc furnace. The arc furnace includes a container for receiving a metal charge, an electrode spaced apart from the container, and an electrical power source coupled to the electrode and the container for generating an electrical discharge between the electrode and the metal charge. The flicker controller comprises a switch electrically connected between the power source and the electrode, and a control system coupled to the switch. The switch includes a gating input for controlling a conduction interval of the switch, and the control system applies gating signals to the gating input for maintaining a magnitude of reactive current flow through the arc furnace substantially constant.

In a preferred embodiment of the invention, the arc furnace comprises a three-phase arc furnace having three arc furnace electrodes, a three-phase power source, and three thyristor sets each connected between a respective one of the power source phases and a respective one of the arc furnace electrodes. The flicker controller includes three reactors, with each reactor being coupled between a phase of the power source and an electrode for providing a reactive current path between the power source and the electrode independent of the conductive state of the thyristors. The reactance of each reactor is selected such that the reactive current drawn by the reactor while the associated electrode is short circuited to ground and the thyristor is off has a maximum value equal to the reactive current drawn by the associated power source phase at full load when the discharge is established and the thyristor is fully conducting. As a result, reactive current drawn by the arc furnace remains substantially constant between short circuit and full load conditions.

Preferably, the arc furnace includes a three-phase stepdown transformer having a primary winding electrically connected to the thyristors and the reactors, and a secondary winding connected to the electrodes. The control system comprises voltage sensors for sensing the voltages at the secondary winding, an analog-to-digital converter coupled to the sensors for digitizing the sensed voltages, a signal processor for determining the average voltage at the secondary windings from the sensed voltages, and a microcontroller for generating the appropriate gating signals for the thyristors from the determined average secondary voltages. More specifically, the signal processor removes any DC offset and noise from the digitized samples, calculates the average secondary voltages from the digitized samples each half cycle, and then outputs the calculated secondary voltages to the microcontroller. The microcontroller includes a look-up table which stores conduction angle values for delaying gating signals to the thyristors in accordance with the conduction angle values. The microcontroller receives the calculated secondary voltages from the signal processor, calculates index values from the calculated secondary voltages, and then uses the index values as address inputs to the look-up table to determine the appropriate conduction angle values for the thyristors.

In one variation, the flicker controller also includes a resistive element coupled to each power source phase and the associated electrode for retarding the flow of real current through the arc furnace when the switch is in an non-conductive state. Preferably, the resistive element comprises a resistor coupled across each thyristor through a transformer. As a result, when the thyristors are off and an electrical discharge is initially formed between the electrode and the container, current flows through the transformers, causing each resistor to appear in series with the respective power source phase and the respective electrode and a real power demand to be imposed on the power source. However, when the thyristors are on, essentially no current flows through the transformers, thereby effectively eliminating the effect of the resistors. Preferably, the magnitude of the resistors is selected so that the real power load demand imposed on the power source by the presence of the resistors when the thyristors are open is half the real power demand imposed at full load when the thyristors are closed. As a result, the power source is exposed to a stepped increase in real power demand at startup, and a stepped decrease in real power demand at shutdown.

BRIEF DESCRIPTION OF THE DRAWINGS

The preferred embodiments of the invention will now be described, by way of example, with reference to the following drawings, in which.

DETAILED DESCRIPTION OF THE PREFERRED EMBODIMENTS

Figure 1:
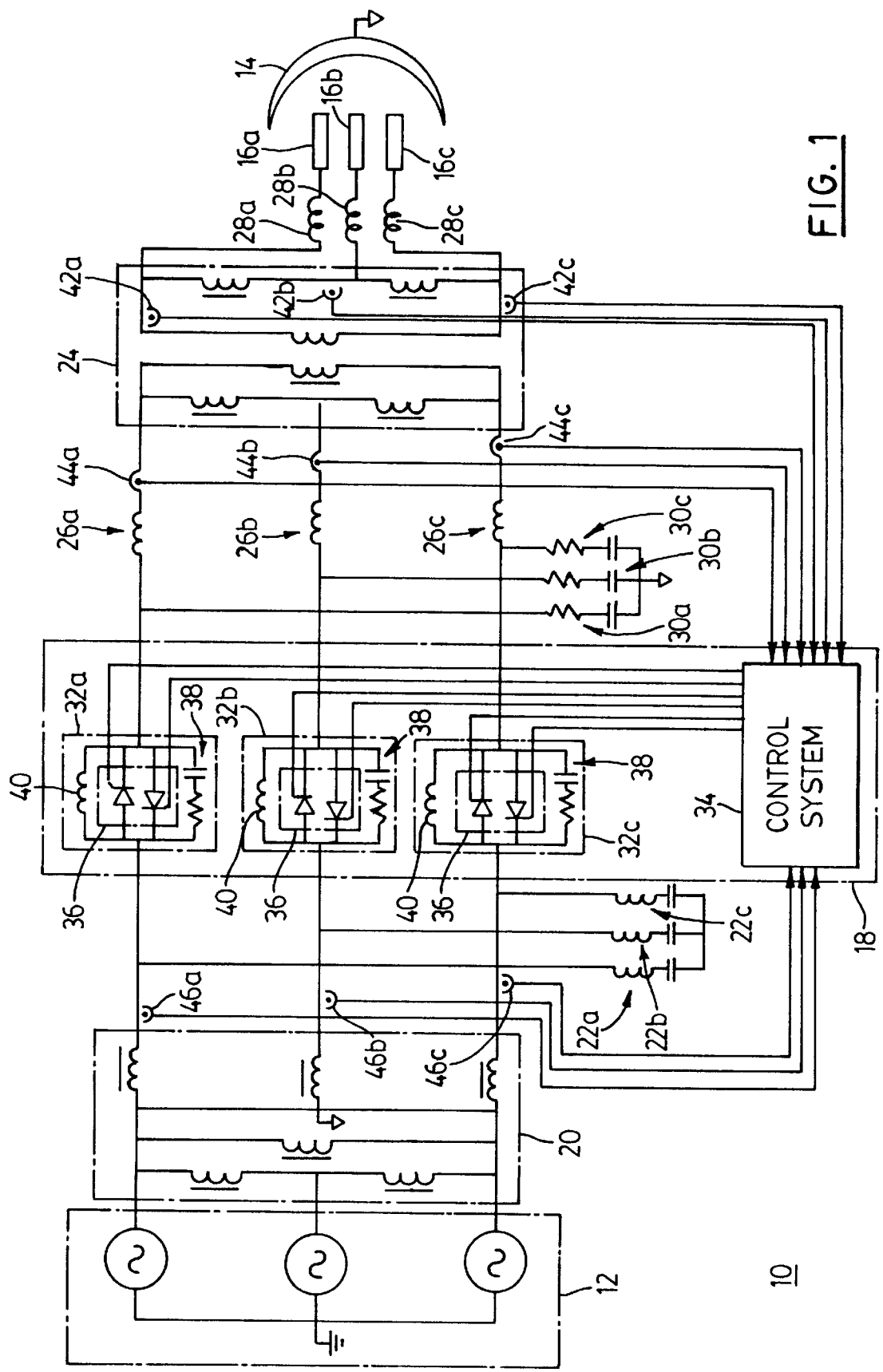
FIG. 1 is a schematic diagram of an electric arc furnace, incorporating a flicker controller in accordance with the present invention.

Turning to FIG. 1, a schematic diagram of an electric arc furnace, denoted generally as 10, is shown coupled to a medium voltage three-phase AC voltage source 12, and comprises a grounded metal container 14, arc furnace electrodes 16 (comprising electrodes 16a, 16b, 16c) disposed within the container 14, and a flicker controller 18 coupled to the voltage source 12 and the electrodes 16. In operation, a metal charge is deposited in the metal container 14 for melting. The electrodes 16 are positioned a distance away from the walls of the metal container 14 and the charge, and electrical discharges are established between the electrodes 16 and the charge so as to heat the charge sufficiently to melt. The flicker controller 18 controls the flow of current through each of the electrodes 16 so as to reduce flicker induced in the power source 12 during the melting process. However, it should be understood that the three-phase implementation is only a preferred implementation, and that arc furnace 10 could include a greater or lesser number of phases without departing from the scope of the invention. For instance, the arc furnace 10 could include only a single phase if desired. Alternately, the voltage source 12 could comprise single or multiple DC voltage sources without departing from the scope of the invention.

The three-phase AC voltage source 12 is coupled to the flicker controller 18 through a three-phase step-down line transformer 20 having a delta-wound primary winding and a wye-wound secondary winding. The primary winding of the line transformer 20 is coupled to the three-phase voltage source 12, and the secondary winding is coupled to the input of the flicker controller 18 and to a VAR compensator 22 for power factor correction. Typically, the three-phase voltage source 12 is a power utility which supplies multiple power consumers, with a voltage of approximately 230 kVAC. The line transformer 20 reduces the voltage supplied by the voltage source 12 to approximately 50 kVAC. However, other voltages may be used if desired. In addition, the line transformer 20 can be eliminated if isolation from the voltage source 12 is not required.

The VAR compensator 22 comprises series LC filters 22a, 22b, 22c, with each LC filter being coupled to a respective output phase of the line transformer 20 secondary. The LC filters 22a, 22b, 22c attenuate the 3rd-order harmonic of the current flowing through the line transformer 20 secondary winding so as to increase the power factor of the arc furnace 10 as seen by the voltage source 12. Generally, VAR compensators are required where, for instance, the power utility has specified that a predetermined minimum power factor must be maintained by its customers. However, as will be appreciated, as flicker generally occurs at frequencies up to 25 Hz, the VAR compensator 22 does not play an appreciable role in flicker control.

The flicker controller 18 is coupled at its outputs to the electrodes 16 through a three-phase step-down furnace transformer 24. The furnace transformer 24 provides isolation between the electrodes 16 and the flicker controller 18 and reduces the output voltage of the flicker controller 18 to about 1125 VAC line-to-line. However, the furnace transformer 24 can be eliminated if a greater output voltage is required, or if the voltage at the voltage source 12 is not of a magnitude requiring voltage step-down.

The furnace transformer 24 has a delta-wound secondary winding and a delta-wound primary winding. Alternately, the furnace 24 may be configured as a wye-wye, delta-wye or wye-delta transformer if desired. The secondary winding of the furnace transformer 24 is coupled to electrodes 16a, 16b, 16c through power cables 28. Associated with each power cable is a respective cable reactance (shown in FIG. 1 as cable reactors 28a, 28b, 28c), with each cable reactor 28 being in series with a respective electrode 16 and a respective phase of the secondary winding of the furnace transformer 24.

The primary winding of the furnace transformer 24 is coupled to the outputs of the flicker controller 18 through fixed series reactors 26a, 26b, 26c, with each fixed reactor 26 being in series with a respective output of the flicker controller 18 and a respective phase of the primary winding of the furnace transformer 24. As will be explained in further detail below, the reactance of each of the fixed reactors 26 is selected such that the reactive current flow in each phase of the arc furnace 10 at full load is equal to the real current flow. Further, each phase of the primary winding of the furnace transformer 24 is tapped to allow the voltage at the electrodes 16 to be adjusted in accordance with the desired operating characteristics for the melt.

Due to the possibility of resonance occurring through interaction of the fixed reactors 26 and the capacitance of the power cables 28, the arc furnace 10 includes a RC damper 30 for preventing undamped oscillations. The RC damper 30 comprises low pass RC filters 30a, 30b, 30c, with each low pass RC filter being coupled to a respective output phase of the flicker controller 18 and a respective fixed reactor 26.

The flicker controller 18 comprises a switch 32 electrically connected between the power source 12 and the electrodes 16, and a control system 34 coupled to the switch 32. The switch 32 has a gating input for controlling the conduction interval of the switch. Since flicker in the conventional arc furnace is a function of variations in reactive current drawn by the arc furnace, the control system 34 applies gating signals to the gating input of the switch 32 in a manner which maintains the magnitude of reactive current flow through the arc furnace 10 substantially constant.

Specifically, since the electrical discharge between each electrode 16 and the charge consists of a significant real current component and a relatively insignificant reactive current component, the magnitude of the reactive current drawn by the arc furnace 10 is a function of the reactance of the arc furnace 10. Further, since the voltage at the electrodes 16 varies with the length of the discharge, the magnitude of the reactive current drawn by the conventional arc furnace is also a function of the electrode voltage. Accordingly, preferably the control system 34 controls the magnitude of reactive current drawn by the arc furnace 10 by first measuring the electrode voltage, and then adjusting the conduction interval of the switch so as to vary the reactance of the arc furnace 10 appropriately. However, the temperature of the electrodes 16 while melting a charge renders accurate electrode voltage measurement difficult. Accordingly, in a preferred implementation, the control system 34 measures the voltage at the secondary winding of the furnace transformer 24 in order to adjust the conduction interval of the switch 32, since the secondary voltage generally closely approximates the electrode voltage.

The switch 32 comprises electronic switches 32a, 32b, 32c, with each electronic switch being coupled between a respective phase of the line transformer 20 secondary and a respective first reactor 26. Preferably, each electronic switch 32a, 32b, 32c comprises a pair of SCRs 36 connected back-to-back, and a snubber circuit 38 connected across the SCRs 36 to prevent damage to the SCRs 36. However, it should be understood that the invention is not limited to SCR electronic switches, but may be implemented with other suitable forms of electronic switches, such as IGBTs, if desired.

For simplicity, each electronic switch 32a, 32b, 32c is shown in FIG. 1 comprising only a single pair of SCRs 36 connected back-to-back. However, to handle the voltages required for the melting process, in the preferred embodiment of the invention, each electronic switch 32a, 32b, 32c comprises a first leg of 44 series-connected SCRs connected in parallel with a second leg of 44 series-connected SCRs, with the first leg of SCRs being oriented in a direction opposite to the second leg of SCRs. As will be appreciated, the number of SCRs required will vary in accordance with the voltage rating of the SCR and the voltage rating of the arc furnace. Additionally, in one variation (not shown), the fixed reactors 26 are positioned in series between the secondary winding of the line transformer 20 and the input to the flicker controller 18 so as to provide additional protection for the switches 32 from overcurrent faults, such as ground faults or line-to-line short circuit faults.

As was discussed above, flicker in the conventional arc furnace results from variations in reactive current drawn by the arc furnace. Accordingly, for improved flicker reduction, the switch 32 includes a by-pass reactor 40, comprising by-pass reactors 40a, 40b, 40c, with each by-pass reactor 40a, 40b, 40c being connected in parallel across the first and second SCR legs of a respective electronic switch 32a, 32b, 32c. In effect, each by-pass reactor 40a, 40b, 40c is coupled to a respective phase of the power source 12 and a respective electrode 16a, 16b, 16c. As a result, each by-pass reactor 40a, 40b, 40c provides a continuous path for the passage of reactive current between the respective phase of the power source 12 and the respective electrode 16a, 16b, 16c, irrespective of the conductive state of the respective switch 32a, 32b, 32c.

With this arrangement, if an electrical discharge is established between the electrodes 16 and the charge, and the arc furnace 10 is operating at less than full load (switches 32 closed for a portion of the power cycle), the reactance introduced by the by-pass reactors 40 into the arc furnace 10 will be dependent upon the conduction interval of the switches 32. If the length of the electrical discharge decreases, the magnitude of the current drawn by the arc furnace 10 will increase, the voltage at the electrodes 16 and at the secondary of the furnace transformer 24 will decrease, and the current drawn by the arc furnace 10 will become increasingly reactive. The flicker controller 18 will then reduce the conduction interval of the switches 32 in response to the decrease in electrode voltage and secondary voltage so as to increase the reactance from the by-pass reactors 40 into the circuit and thereby reduce the reactive overcurrent draw. Similarly, if the length of the electrical discharge increases, the magnitude of the current drawn by the arc furnace 10 will decrease, the voltage at the electrodes 16 and at the secondary of the furnace transformer 24 will increase, and the current drawn by the arc furnace 10 will become increasingly real. The flicker controller 18 will then increase the conduction interval of the switches 32 so as to decrease the reactance from the by-pass reactors 40 and thereby increase the reactive current draw.

From the foregoing, it will be appreciated that the current drawn by the arc furnace 10 when the electrodes 16 are short circuited to ground and the switches are fully off will be essentially 100% reactive, and that the current drawn by the arc furnace 10 when a full load electrical discharge is established and the switches 32 are fully on will be determined by the reactance of the arc furnace 10 (including the reactance of the fixed reactors 26). Accordingly, to limit variations in reactive current draw, preferably the values of the by-pass reactors 40 are selected so that the maximum magnitude of reactive current drawn by each by-pass reactor 40a, 40b, 40c, while the respective electrode 16a, 16b, 16c is short circuited to ground and the associated switch 32a, 32b, 32c is off, is equal to the magnitude of reactive current passing through each electrode 16a, 16b, 16c at full load, while electrical discharges are established between the electrodes 16 and the charge and the associated switch 32a, 32b, 32c is fully on. This selection criterion allows the flicker controller 18 to maintain the reactive current drawn by the arc furnace 10 substantially constant over the full range of operating conditions, namely between full load operation and short circuit operation.

To maximize the power transfer to the electric discharge at full load, the reactance of the arc furnace 10 (including the reactance of the fixed reactors 26) must be approximately equal to the resistance of the electric discharge at full load. With this design criterion, the reactive power of the arc furnace 10 at full load current will be equal to the average power of the electric discharge at full load, thereby providing the arc furnace 10 with a power factor PF=0.7 at full load (since the phase angle between real current and total current will be 45°). Therefore, $$I_T = \frac{V_{12}}{R+jX} = \frac{V_{12}R}{R^2+X^2} - j\frac{V_{12}X}{R^2+X^2} \text{ so that}$$

$$|I_T| = \frac{V_{12}}{R^2+X^2}\sqrt{R^2+X^2} \text{ and } |I_X| = V_{12}\frac{X}{R^2+X^2},$$

where:

$V_{12}$=voltage at the voltage source 12

$I_T$=total line current $I_X$=reactive current

R=resistance of the arc (electric discharge)

X=reactance of the arc furnace

Since PF = 0.7 at full load, R = X and $$\left|\frac{I_X}{I_T}\right| = \frac{1}{\sqrt{2}}$$

so that reactive current at full load in each phase is approximately 70% of the total full load current in each phase. Therefore, preferably the fixed reactors 26 are selected such that each phase of the arc furnace 10 draws a magnitude of reactive current at full load which is approximately 70% of the total full load current drawn by each phase.

In addition, preferably the by-pass reactors 40 in each phase have a per-unit value of approximately 0.7 p.u. These latter reactor values limit the maximum magnitude of reactive current drawn by each by-pass reactor 40a, 40b, 40c, while the respective electrode 16a, 16b, 16c is short circuited to ground and the associated switch 32a, 32b, 32c is off, also to 70% of full load current. As a result, by varying the conduction angle of the switches 32 between fully on and fully off, the flicker controller 18 is able to maintain control over flicker over the full range of operating conditions (between full load and short circuit) while maintaining a favourable power transfer to the arc furnace 10 at full load.

As discussed above, variations in electrode voltage are related to variations in arc length. Therefore, it is desirable to maximize the reactance of the arc furnace 10 so as to maximize the stability of the electric discharge from the electrodes 16. On the other hand, the power factor of the arc furnace 10 will decrease as the reactance of the arc furnace 10 is increased, thereby reducing the power transfer to the arc furnace 10. Accordingly, by maintaining reactive current draw at approximately 70% of full load current, it is believed that a favourable comprise is obtained between stability and power transfer over the full range of operating conditions. However, it will be appreciated that other operating points may be selected so as to achieve greater stability or greater power transfer without departing from the scope of the invention.

It will also be appreciated that it is necessary to design the arc furnace 10 to maintain the reactive current constant over a suitable range of electrode voltages. In the preferred embodiment, the arc furnace 10 is designed such that when the switches 32 are fully on and full load current is being drawn, the power factor of the arc furnace 10 is approximately PF=0.7. As a result, R=X at full load, and $$|V_{arc}| = V_{OC}\frac{R}{|R+jX|} = \frac{V_{OC}}{\sqrt{2}} = 0.7\ V_{OC}$$

where $V_{arc}$=electrode voltage $V_{OC}$=open circuit voltage so that the magnitude of the electrode voltage (and the furnace transformer 24 secondary voltage) reaches approximately 70% of the magnitude of the open circuit electrode voltage at full load. Accordingly, preferably the flicker controller 18 measures the electrode voltage directly, and allows the electrode voltage to vary between 70% of open circuit electrode voltage and 0% of open circuit electrode voltage (ie. short circuit).

However, as discussed above, it is desirable to measure the furnace transformer 24 secondary voltage instead of measuring the electrode voltage directly. In practice, however, if the flicker controller 18 controls the arc furnace 10 by measuring the furnace transformer 24 secondary voltage, when the switches 32 are fully off and the electrodes 16 are short circuited the magnitude of the furnace transformer 24 secondary voltage will drop to approximately 30% of the magnitude of the open circuit electrode voltage. Favourable results have been attained at maintaining the reactive current substantially constant at approximately 70% of full load current by operating the arc furnace with a furnace transformer 24 secondary voltage between 70% and 30% of open circuit voltage. However, it is desirable to turn the switches 32 fully off well before the secondary voltage reaches 30% of open circuit voltage. Accordingly, with an open circuit voltage of approximately 650 VAC line-to-ground, preferably the operating range of the flicker controller 18 is between 450 VAC line-to-ground and 300 VAC line-to-ground. This operating range provides acceptable control over flicker and without significant impact on the power transfer to the arc furnace 10.

Figure 2:
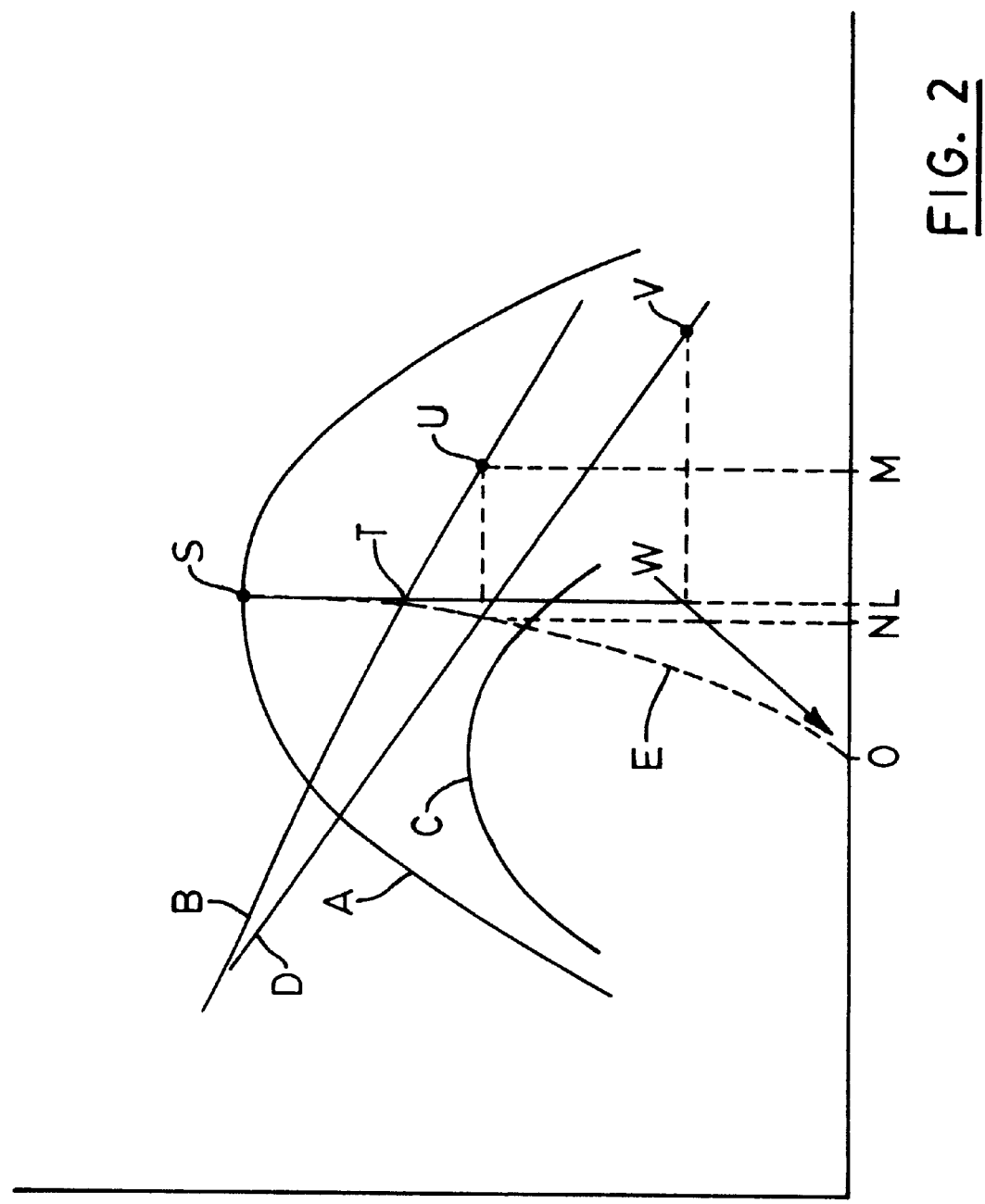
FIG. 2 is a graph showing the variations in power transfer and electrode voltage with total line current for the electric arc furnace shown in FIG. 1.

The foregoing discussion will be more readily understood by referring to FIG. 2, which shows the variations in power transfer and secondary voltage with line current. Curve A shows the variation in power transfer to the electric discharge with the switches 32 fully on (ie. maximum conduction interval). The maximum power transfer to the electric discharge occurs at maximum point S on curve A, corresponding to PF=0.7. The associated full load current occurs at point L, and is 70% reactive.

Curve B shows the variation in secondary voltage with total line current at PF=0.7, with point T denoting the secondary voltage at full load current (70% of open circuit voltage). In a conventional arc furnace, if the secondary voltage dropped to point U on curve B, the total line current would increase to point M. However, in the present invention, the conduction interval of the switches 32 decreases in response to the decrease in secondary voltage, causing the reactance of the arc furnace 10 to increase, the power factor to drop, and the line current to drop to point N. At point N, the total reactive current drawn by the arc furnace 10 is again substantially equal to the reactive current drawn at full load (70% of full load current).

Curve C shows the power transfer relationship for the electric discharge with the switches 32 operating with the reduced conduction interval, and curve D shows the variation in secondary voltage with total line current at the reduced conduction interval. If the secondary voltage drops below the value at point V (30% of open circuit voltage), the flicker controller 18 turns off the switches 32. At this point, the electrodes 16 would be short circuited to the metal charge, the operating point would shift to point O, and the total current drawn by the arc furnace 10 would be substantially 100% reactive and 70% of full load current. However, as discussed above, preferably the flicker controller 18 turns off the switches 32 before the secondary voltage drops to 30% of open circuit voltage.

Curve E shows the variation in reactive current drawn by the arc furnace 10 between full load operation and short circuit operation if the total line current was maintained constant. It will be apparent from curve E that the total line current provides a close approximation for the reactive current, particularly between operating point S and operating point W (corresponding to secondary voltage V). Accordingly, in one implementation of the invention, rather than attempting to directly control the magnitude of reactive current draw, the flicker controller 18 reduces flicker by varying the conduction intervals of the switches 32 so as to maintain the total line current substantially constant at point L, between operating points S and W. When the voltage at the electrodes 16 drops below point V (or 300 VAC line-to-ground as in the preferred implementation), the switches 32 are fully open and the total line current moves to point O.

Figure 3:
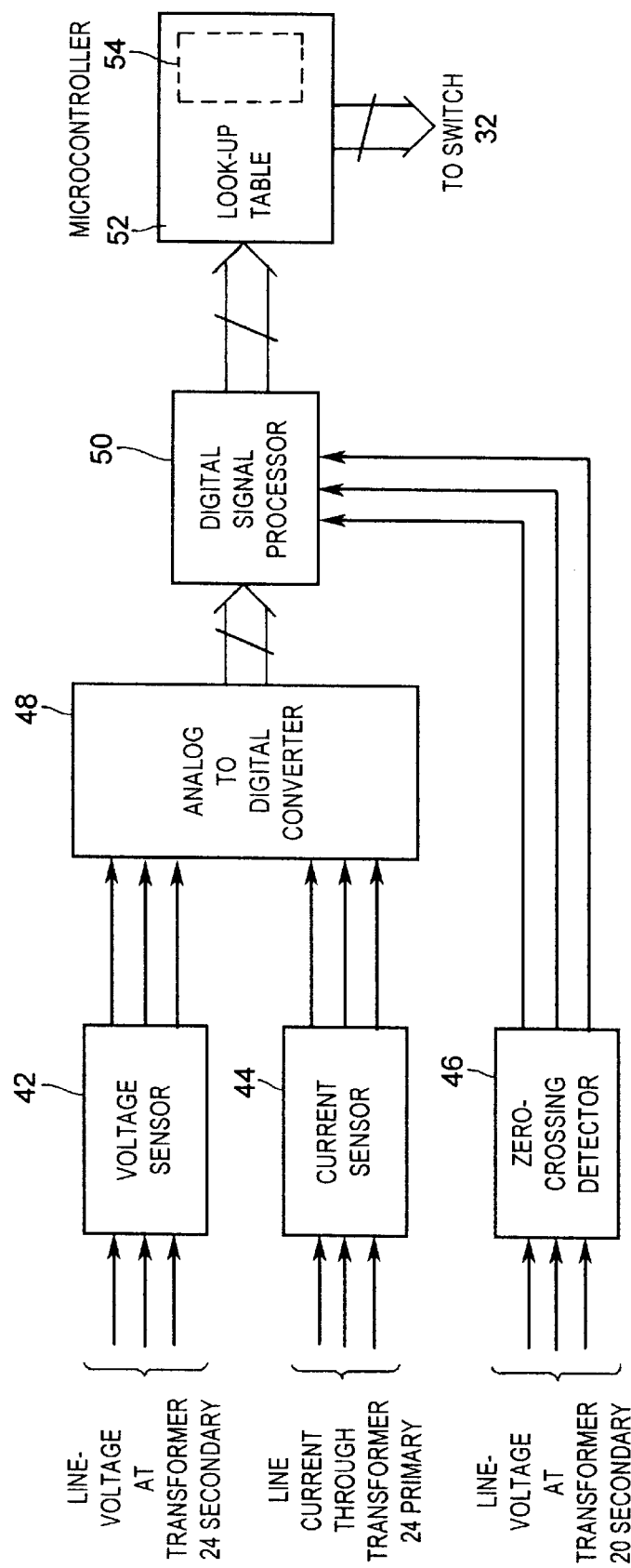
FIG. 3 is a block diagram showing the control system of the flicker controller.
Figure 4A:
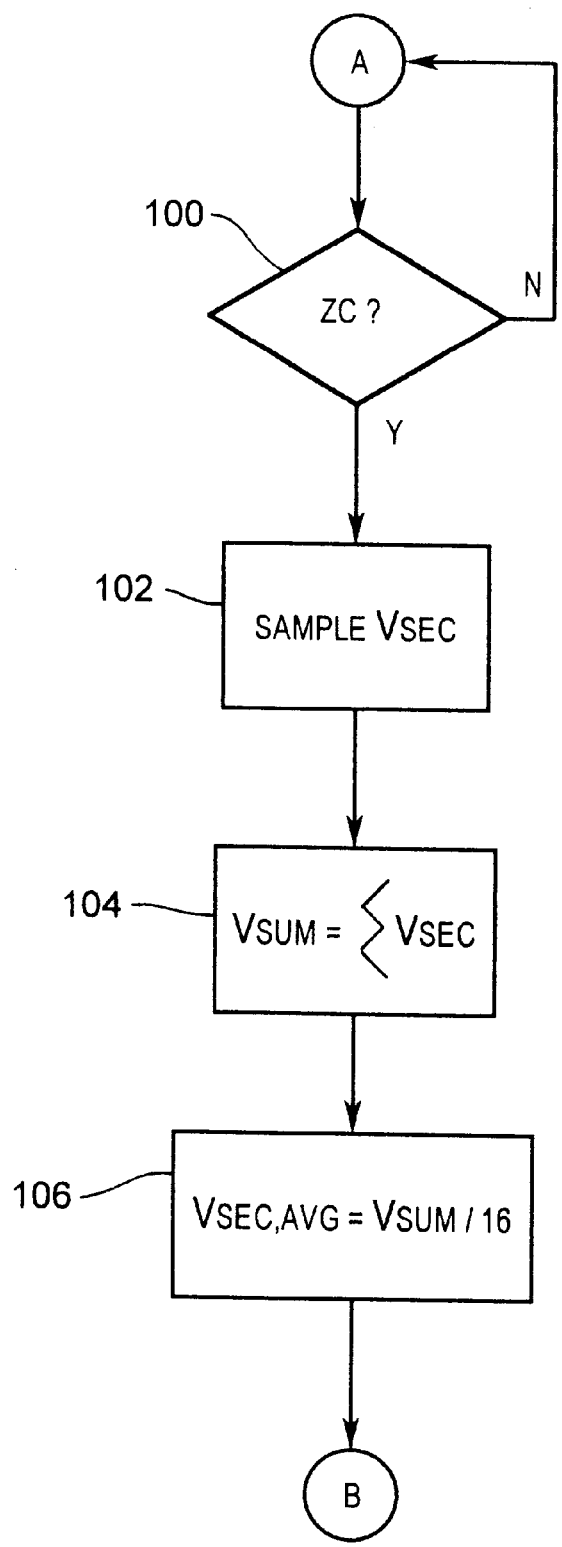
FIGS. 4a, 4b and 4c together comprise a flow chart depicting the flicker control algorithm employed by the flicker controller.
Figure 4B:
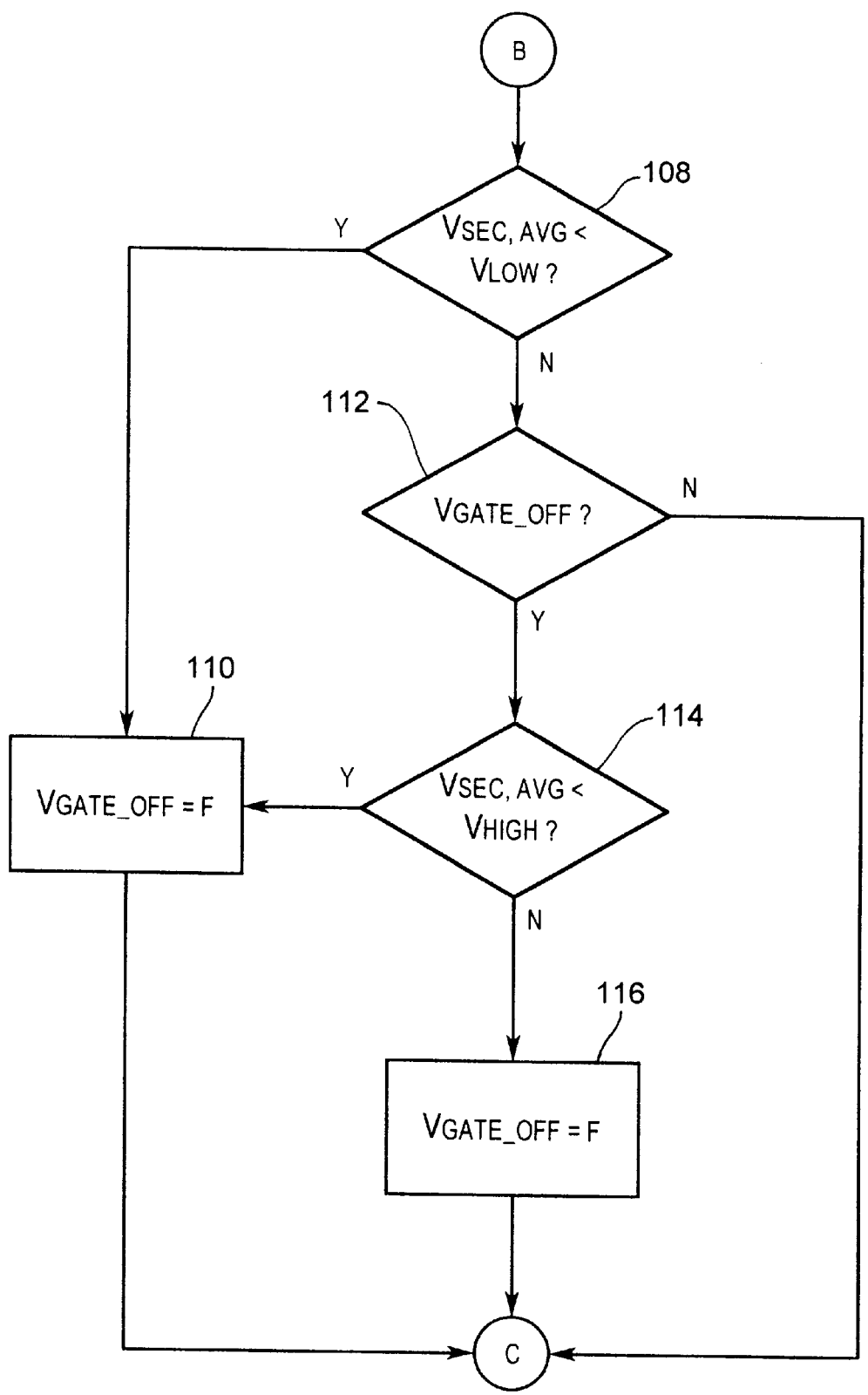
Figure 4C:
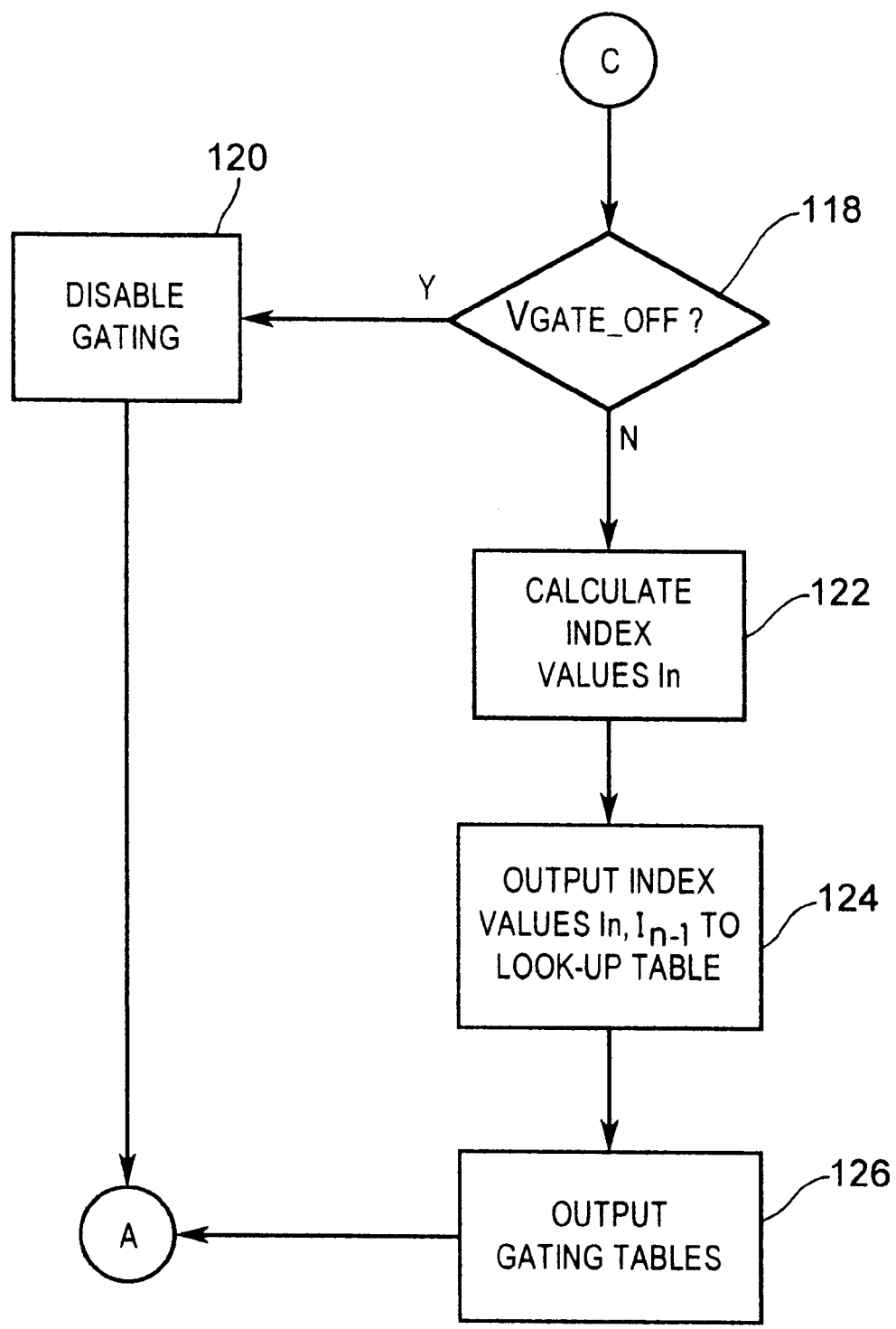

Turning now to FIG. 3, the control system 34 for the flicker controller 18 is shown including a voltage sensor 42 for measuring the line-to-virtual ground voltage at each phase of the furnace transformer 24 secondary winding, a current sensor 44 for measuring the line current flowing through each phase of the furnace transformer 24 primary winding, and a zero-crossing (ZC) detector 46 for detecting each zero crossing of the voltage at each phase of the line transformer 24 secondary winding. The control system 34 also includes an analog-to-digital converter (ADC) 48 coupled to the voltage sensor 42 for digitizing the measured line-to-virtual ground voltages, a digital signal processor (DSP) 50 coupled to the ADC 48 for determining the average voltages at the secondary winding of the furnace transformer 24, and a microcontroller 52 coupled to the DSP 50 for generating the appropriate gating signals to the switch 32 from the secondary voltages.

The voltage sensor 42 comprises voltage sensors 42a, 42b, 42c, with each voltage sensor being coupled to a respective phase of the furnace transformer 24 secondary winding. The ZC detector 46 comprises zero-crossing detectors 46a, 46b, 46c, with each zero-crossing detector being coupled to a respective phase of the line transformer 20 secondary winding. The DSP 50 is coupled to the digital output of the ADC 48 and samples the digitized voltages at a frequency of 32 times the power cycle frequency. The DSP 50 then filters out any DC offset and noise from the digitized voltage samples, and calculates the average furnace transformer 24 secondary voltages from the filtered samples. The calculated average values are then output to the microcontroller 52.

The output of the ZC detector 46 is used by the DSP 50 for synchronization purposes only. Accordingly, in one variation (not shown), the ZC detector 46 comprises a single zero-crossing detector coupled to one phase of the line transformer 20 primary winding, and with the zero crossings of the remaining phases being calculated from the zero crossings and the line frequency of the measured phase.

The current sensor 44 comprises current sensors 44a, 44b, with each current sensor being coupled to a respective phase of the furnace transformer 24 primary winding. In one implementation of the invention, the current sensor 44 is used by the operator to monitor the operation of the arc furnace 10 and plays no role in varying the conduction angles of the switches 32. In this implementation, the microcontroller 52 controls flicker by using measurements of the furnace transformer 24 secondary voltage received from the DSP 50. However, in another implementation, the microcontroller 52 controls flicker from calculations of electrode voltage received from the DSP 50. In this latter implementation, the DSP uses the turns ratio of the furnace transformer 24, and measurements of line current received from the current sensor 44, to calculate the voltage drop across the power cables 28. The DSP 50 then calculates the electrode voltage by subtracting the calculated power cable voltage drop, in quadrature, from the furnace transformer 24 secondary voltage. Alternately, it is believed that the electrode voltage could be measured directly with the use of suitable voltage sensors.

In a preferred implementation of the control system 34, the microcontroller 52 comprises a Motorola Microcontroller MC68332. The microcontroller 52 includes a two dimensional look-up table 54 stored in RAM, and is programmed with an algorithm for supplying gating signals to the switch 32, based on the scaled voltages received from the DSP 50. The look-up table 54 includes a plurality of pre-calculated conduction angle values which are used by the microcontroller 52 to delay gating signals to the switches 32a, 32b, 32c in accordance with the conduction angle values. The first dimension of the look-up table 54 receives address data representative of the average half-cycle voltage at each phase of the furnace transformer 24 secondary. The second dimension of the look-up table 54 receives address data indicative of the previous average half-cycle voltage at each phase of the furnace transformer 24 secondary. Where the voltage drop across the power cables 28 is significant, the conduction angle values are pre-calculated to take this voltage drop into account. Alternately, where electrode voltage is used as the input variable to the microcontroller 52, the look-up table 54 receives address data representative of the average half-cycle electrode voltage.

To generate the appropriate address data, the microcontroller 52 first creates index values from the average voltage values received from the DSP 50. For instance, if the full scale secondary/electrode voltage was 650 VAC line-to-virtual ground, and the first dimension of the look-up table 54 included 1024 entries, the resolution for the average secondary/electrode voltage would be 650/1024=0.6347 volts. Therefore, if the calculated average secondary/electrode voltage was 325.5 VAC line-to-virtual ground, the index value would be INT (325.5/0.6354)=512. After the DSP 52 calculates the index values for each phase of the furnace transformer 24 secondary voltage, the index values are supplied to the look-up table 54 as address inputs for the first dimension.

Since a variation in conduction interval in one cycle will not only impact on the magnitude of reactive current drawn by the arc furnace 10, but also impact on the voltage measured at the furnace transformer 24 secondary in the subsequent cycle, a reactive current correction which failed to consider the corrective measure taken in the preceding cycle could mistakenly cause endless corrections in the conduction interval. For instance, if the voltage measured at the furnace transformer 24 secondary indicated that the secondary voltage (and therefore the electrode voltage) had dropped, there would be an increase in reactive current drawn by the arc furnace 10. Therefore, the appropriate response would be to reduce the conduction interval to increase the reactance of the flicker controller 18 so as to reduce the reactive current draw. However, the reduction in conduction interval would also reduce the voltage at the furnace transformer 24 secondary, which could cause the flicker controller 18 to further reduce the reactive current draw in the subsequent cycle.

Accordingly, to guard against the possibility of excessive corrections in conduction intervals where secondary voltage is used as the input variable to the microcontroller 52, the scaled secondary voltages from the previous reactive current correction are supplied to the look-up table 54 as address inputs for the second dimension. Based on both sets of address inputs, the look-up table 54 yields new conduction angle values which are then used by the microcontroller 52 to delay the gating signals to the switches 32. As will be apparent, the index values for the present secondary voltages are retained for use in the subsequent reactive current correction. However, where electrode voltage is used as the input variable to the microcontroller 52, it is believed there would be no such iteration problem and, accordingly, the second dimension of the look-up table 54 could be eliminated.

Two mechanisms of flicker control employed by the control system 34, including the flicker control algorithm programmed in the microcontroller 52, will now be explained in further detail with reference to FIGS. 4a–4d.

For simplicity, FIGS. 4a–4d show flicker control for a single phase. It should be understood that flicker control for the other phases operates in a similar manner.

At step 100, the DSP 50 waits for a zero crossing to be detected at ZC detector 46. Once detected, at step 102 the DSP 50 samples the digital output of the ADC 48 at the sample frequency of 32 times per power cycle. After 16 samples of the sensor output of the voltage sensor 42 have been made, the DSP 50 sums the absolute value of each voltage sample, at step 104. At step 106, the DSP 50 calculates the average value of the furnace transformer 24 secondary winding line-to-virtual ground voltage $V_{sec,avg}$ from the value obtained at step 104. Since this calculation is based on only 16 samples of the line-to-virtual voltage at the furnace transformer 24 secondary, the DSP 50 is able to calculate the average furnace transformer 24 secondary line-to-virtual ground voltage $V_{sec,avg}$ after every half cycle. After the average value of the line-to-virtual ground secondary voltage $V_{sec,avg}$ has been calculated at step 106, the task identified at step 108 is performed next.

At step 108, the DSP 50 compares the calculated average secondary voltage $V_{sec,avg}$ against a first threshold limit $V_{low}$. In this instance, preferably the first threshold limit $V_{low}$ is 300 VAC line-to-ground. However, if the DSP 50 calculates electrode voltage, it is believed that the first threshold limit $V_{low}$ may be as 0 VAC.

If the average secondary voltage $V_{sec,avg}$ (or electrode voltage) is less than $V_{low}$, short circuiting of the electrodes 16 is assumed to be imminent or in fact occurring, and a control signal $V_{gate\_off}$=TRUE is sent from the DSP 50 to the microcontroller 52 at step 110 to prevent the microcontroller 52 from applying gating signals to the switch 32. Control then proceeds to step 118.

On the other hand, if the average secondary voltage $V_{sec,avg}$ is greater than or equal to $V_{low}$, the DSP 50 reads the status of the control signal $V_{gate\_off}$ at step 112 to determine if the flicker controller 18 was previously shut off. If $V_{gate\_off}$=TRUE, the flicker controller 18 was turned off at a previous iteration of step 110, and the DSP 50 compares the calculated average secondary voltage $V_{sec,avg}$ against a second (greater) threshold limit $V_{high}$ at step 114. In this instance, preferably the second lower threshold limit $V_{high}$ is 320 VAC line-to-ground. However, if electrode voltage is used as the test parameter, the second threshold limit $V_{high}$ may be much lower than 320 VAC.

If the average secondary voltage $V_{sec,avg}$ (or electrode voltage) is less than $V_{high}$, unstable operation is assumed to be occurring, and the control signal $V_{gate\_off}$=TRUE is maintained to the microcontroller 52 to prevent the microcontroller 52 from applying gating signals to the switch 32. Control then proceeds to step 118. However, if the average secondary voltage $V_{sec,avg}$ (or electrode voltage) is greater than or equal to $V_{high}$, it is assumed that the flicker controller 18 may be operated again, and the control signal $V_{gate\_off}$=FALSE is sent to the microcontroller 52 at step 116. Control then proceeds to step 118.

If the DSP 50 determines, at step 112 that $V_{gate\_off}$=FALSE, control proceeds directly to step 118.

At step 118, the microcontroller 52 reads the status of the control signal $V_{gate\_off}$ from the DSP 50. If $V_{gate\_off}$=TRUE, gating signals to the switch 32 are removed at step 120, turning the switch 32 off. Control then returns to step 100 in preparation for the next zero crossing of the line transformer 20 secondary voltage.

On the other hand, if $V_{gate\_off}$=FALSE, the microcontroller 52 reads the average value of the line-to-virtual ground secondary voltage $V_{sec,avg}$ (or electrode voltage) from the DSP 50, and then calculates the index values $I_n$ for the look-up table 54 at step 122, as described above. At step 124, the index values $I_n$ calculated in step 122 and the index values $I_{n-1}$ calculated in the preceding iteration of step 122 are output to the look-up table 54 as address inputs to provide new conduction angle values. At step 126 the microcontroller outputs gating signals to the switch 32 in accordance with conduction angle values received from the look-up table 54.

As discussed above, preferably the conduction angle values cause the reactive current or total current to remain constant between full load secondary voltage and $V_{low}$, and take into consideration the voltage drop of the power cables 28. This may be accomplished by using the electrode voltage as the test parameter, as discussed above. Alternately, where the test parameter is secondary voltage, the power cable 28 voltage drop may taken into account by appropriately adjusting the conduction angles values in the look-up table 54.

After the application of the gating signals, control returns to step 100.

It will be apparent that the flicker controller 18 limits changes in reactive current demands imposed by the arc furnace 10 on the power source 12. However, some utilities also impose limits on power consumers on the rate of change of real power demands which can be imposed. Although the flicker controller 18 ameliorates against the flicker problem inherent in prior art arc furnaces, the flicker controller 18 does not reduce the rate of change of real power demand imposed by the arc furnace 10 on the power source 12. The electric arc furnace 110, shown in FIG. 5 addresses this deficiency of the arc furnace 10.

Figure 5:
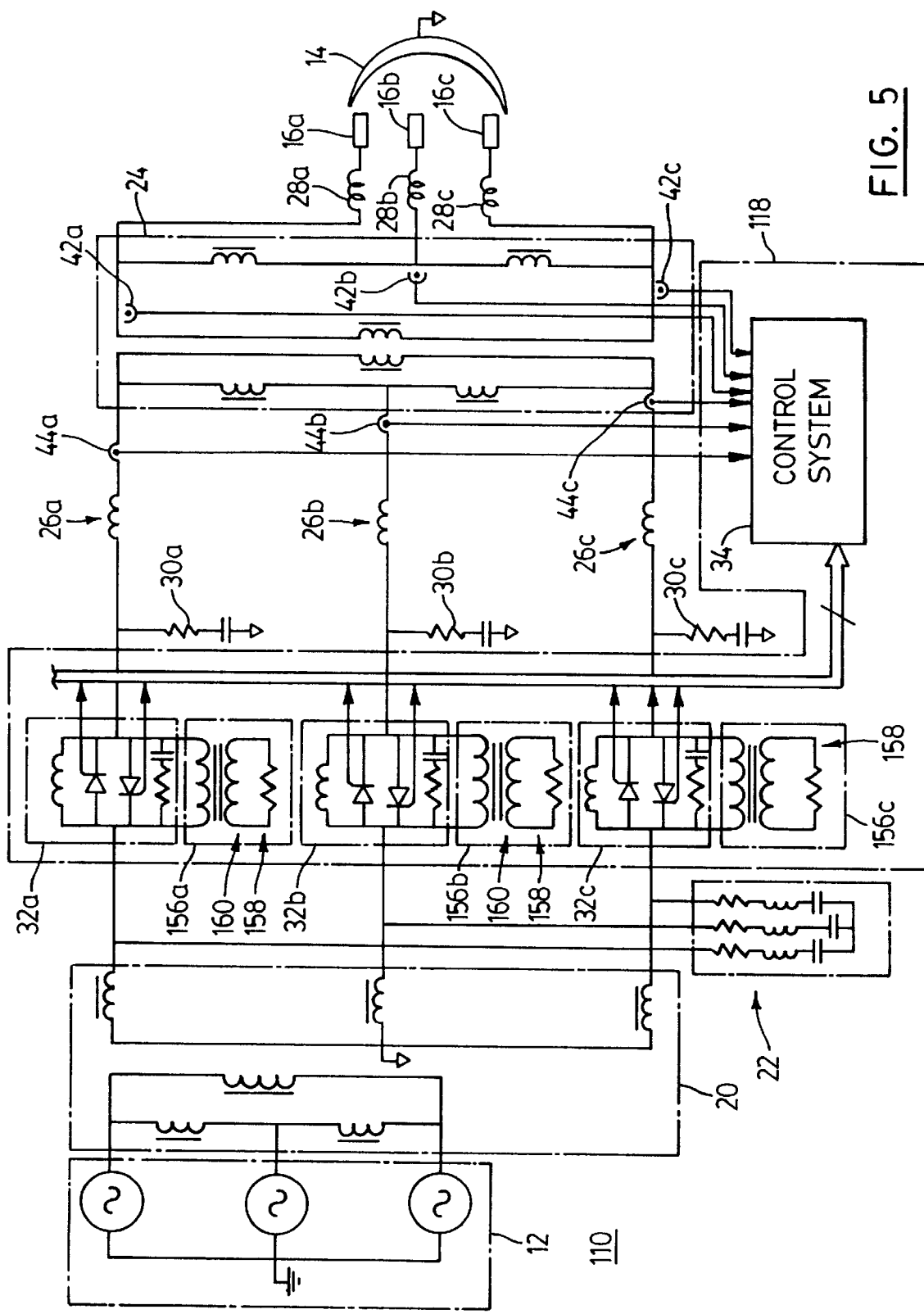
FIG. 5 is a schematic diagram of an electric arc furnace, incorporating a real power fluctuation controller.

The electric arc furnace 110, shown in FIG. 5, is substantially identical to the electric arc furnace 10. Accordingly, elements of the arc furnace 110 which correspond to elements of the arc furnace 10 shown in FIG. 1 are denoted in FIG. 5 with corresponding reference numerals. Unlike the flicker controller 18, however, the flicker controller 118 shown in FIG. 5 includes a real power fluctuation controller 156 for controlling changes in real power demand imposed on the power source 12 when the arc furnace 110 is coupled to the power source 10 and the switch 32 is in a non-conductive state. However, it should be understood that the real power fluctuation controller 156 is not limited for use with the flicker controller 18, but may be used instead with any series-type arc furnace flicker controller. In addition, the real power fluctuation controller may be used in any environment in which a load is coupled to a power source through a switch and it is desired to control the change in real power demand imposed on the power source when the load is connected to or disconnected from the power source.

The real power fluctuation controller 156 comprises real power controllers 156a, 156b, 156c, with each real power controller being coupled to a respective one of the electronic switches 32a, 32b, 32c. Each real power controller comprises a resistor 158, and a transformer 160 having a primary winding connected across the respective electronic switch 32a, 32b, 32c and a secondary winding connected to the resistor 158. As will become apparent, the resistors 158 may be coupled directly across the switches 32. However, the transformers 156 allow the voltage rating of the resistors 158 to be reduced.

Figure 6:
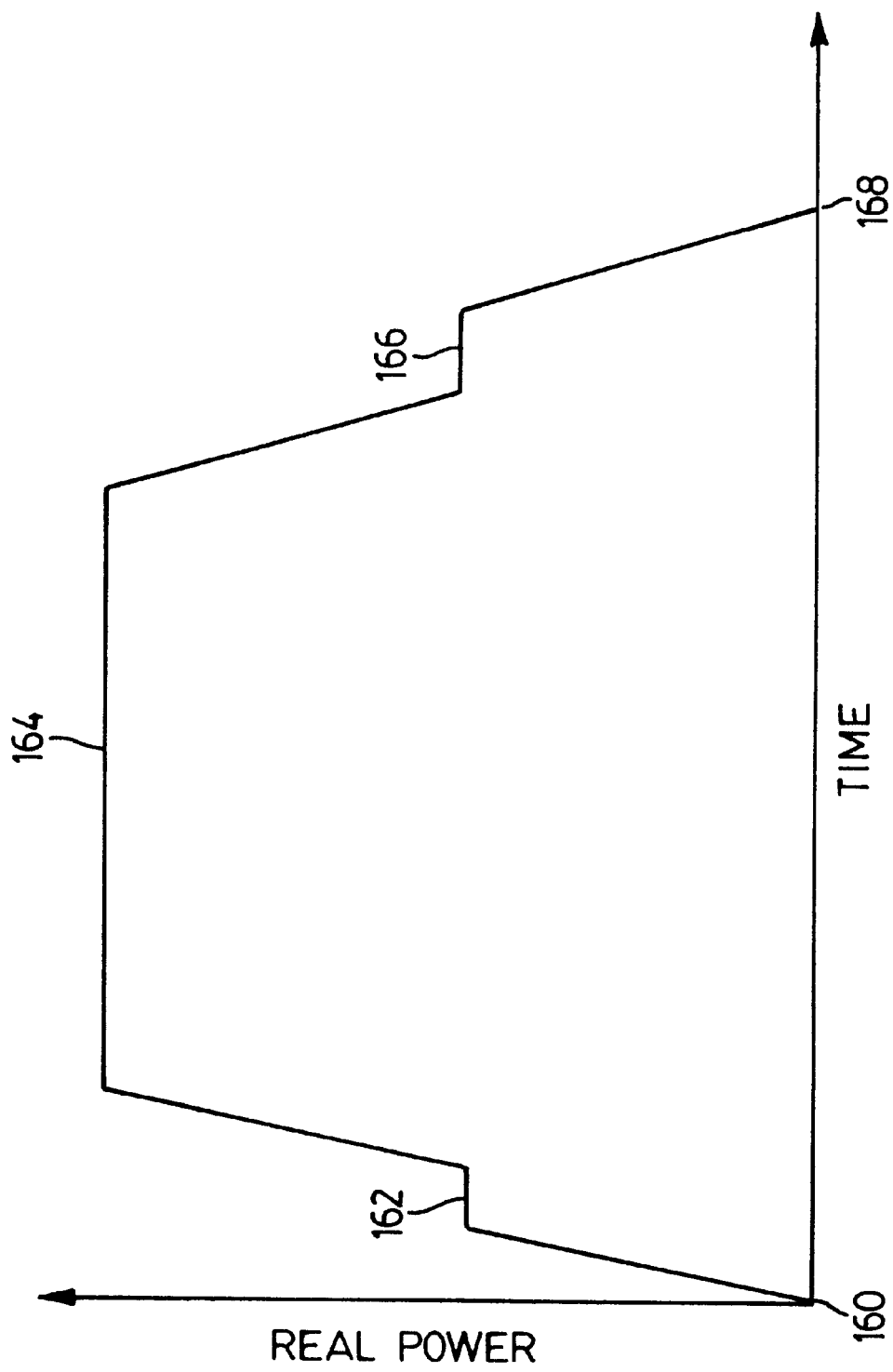
FIG. 6 is a timing diagram depicting changes in real power demands made by the electric arc furnace shown in FIG. 5.

The operation of the real power fluctuation controller 156 will now be explained with reference to FIG. 6. FIG. 6 is a timing diagram depicting changes in real power demands made by the electric arc furnace 110 on the power source 12 when the switch 32 is changed between conductive states. At the portion of the timing diagram denoted by reference numeral 160, the switch 32 is fully off and power is not applied from the power source 12 to the arc furnace 110. At the portion denoted by reference numeral 162, the switch 32 is still off but power is applied from the power source 12. As a result, current flows through the primary winding of the transformers 158a, 158b, 158c, causing the resistors 156a, 156b, 156c to appear across the respective switch 32a, 32b, 32c and in series with the respective phase of the power source 12 and the respective electrode 16a, 16b, 16c, and an electrical discharge to be established between the electrodes 16 and the charge. However, as the resistors 156 are effectively in series with the power source 12 and the electrodes 16, the flow of real current through the arc furnace 110 is less than if the switches 32 were fully closed.

At the portion of the timing diagram denoted by reference numeral 164, the switch 32 is closed via the flicker controller 18. As the resistance of each switch 32a, 32b, 32c is significantly less than the resistance of the resistors 156a, 156b, 156c, current is diverted from the primary windings of the transformers 158a, 158b, 158c to the switches 32a, 32b, 32c causing the resistors 156a, 156b, 156c to be effectively removed from the arc furnace 110. Although the switches 32a, 32b, 32c are switched repeatedly between the conductive state and the non-conductive state in accordance with their respective conduction angles, as described above with reference to FIGS. 1 to 4, preferably the frequency at which the switches 32a, 32b, 32c are switched and the reactances of the transformers 158a, 158b, 158c are such that the resistors 156a, 156b, 156c remain removed from the arc furnace 110 during those portions of the switching cycle in which the switches 32a, 32b, 32c are not fully off. As a result, the magnitude of real current drawn by the arc furnace 110 is dictated by the position of the electrodes 16 to the charge.

Preferably, the value of the resistors 156a, 156b, 156c is selected such that the real power drawn by the arc furnace 110 at the portion 162 is half the real power drawn by the arc furnace 110 at full load when the switches 32a, 32b, 32c are fully on. Accordingly, it will be appreciated that the resistors 156a, 156b, 156c have the effect of limiting changes in real power demand imposed on the power source 12 when the arc furnace 110 is first coupled to the power source 10 and the switch 32 is in a non-conductive state.

After the arc furnace 110 has been operated over a period sufficient to achieve the desired melt, the arc furnace 110 is shut down by opening the switch 32. As shown at the portion of the timing diagram denoted by reference numeral 166, opening the switch 32 causes current to be diverted to the primary windings of the transformers 158a, 158b, 158c and the resistors 156a, 156b, 156c to be connected effectively in series again with the respective phase of the power source 12 and the respective electrode 16a, 16b, 16c. As a result, the magnitude of real current drawn by the arc furnace 110 decreases to the same value as at portion 162. At the portion of the timing diagram denoted by reference numeral 168, power is removed from the arc furnace 110 and the arc furnace 110 is fully off. Accordingly, it will be appreciated that the real power fluctuation controller 156 exposes the power source 12 to a stepped increase in real power demand at arc furnace 110 startup, and a stepped decrease in real power demand at arc furnace 110 shutdown. In one variation, not shown, the resistors 156a, 156b, 156c are each replaced with a plurality of resistors which are coupled to the transformer 158 secondary through respective switches for creating a plurality of stepwise real power increments and stepwise real power decrements.

A person skilled in the art may conceive of other variations and alternative embodiments, all of which are believed to be within the sphere and scope of the invention as defined by the claims appended hereto.

We claim:

1. A flicker controller for reducing flicker induced in an AC power source by an AC electric arc furnace, the arc furnace including container for receiving metal, and an electrode spaced apart from the container, the power source being coupled to the electrode and the container for generating an electric discharge from the electrode, the flicker controller comprising:

a switch electrically connected in series with the power source and the electrode and including a gating input for controlling the application of AC power to the electrode;

a reactive element electrically coupled between the power source and the electrode for providing a reactive current path between the power source and the electrode independent of a conductive state of the switch; and a control system for applying gating signals to the gating input for maintaining a magnitude of reactive current flow through the arc furnace substantially constant.

2. The flicker controller according to claim 1, wherein the reactive element comprises a reactor coupled across the switch.

3. The flicker controller according to claim 2, wherein the reactive element is selected such that the reactive current drawn by the reactive element while the electrode is short circuited to ground and the switch is in a non-conductive state has a maximum value equal to the reactive current drawn by the arc furnace at full load while the discharge is established and the switch is fully conducting.

4. The flicker controller according to claim 3, wherein the maximum value is 70% of the full load current.

5. The flicker controller according to claim 1, wherein the control system generates the gating signals in response to a voltage at the electrode.

6. The flicker controller according to claim 5, wherein the gating signals are generated after each half cycle of the electrode voltage.

7. The flicker controller according to claim 1, wherein the gating signals are applied to the gating input to maintain a total current through the arc furnace substantially constant over a range of electrode voltage.

8. The flicker controller according to claim 7 wherein the range of electrode voltage extends between 30% and 70% of open circuit electrode voltage.

9. The flicker controller according to claim 1, wherein the control system includes a voltage sensor for sensing a voltage at a location away from the electrode, and the control system generates the gating signals in response to the sensed voltage.

10. The flicker controller according to claim 1, wherein the flicker controller includes a resistive element coupled to the power source and the electrode for effecting stepwise changes in real power demand imposed on the power source after the arc furnace is coupled to the power source and before the arc furnace is uncoupled from the power source.

11. The flicker controller according to claim 10, wherein the resistive element is coupled across the switch through a transformer for reducing a voltage rating of the resistive element.

12. The flicker controller according to claim 1, wherein the control system comprises a signal processor for determining a conduction state of the electrical discharge, and a microcontroller for generating the gating signals from the determined conduction state.

13. The flicker controller according to claim 12, wherein the arc furnace includes a transformer having a primary winding electrically connected to an output of the switch, and a secondary winding electrically connected to the electrode, and the signal processor determines the conduction state from a voltage at the secondary winding.

14. The flicker controller according to claim 13, wherein the control system generates the gating signals in response to a half cycle of the secondary voltage.

15. The flicker controller according to claim 13, wherein the control system includes a voltage sensor for sensing the secondary voltage, an analog-to-digital converter coupled to the sensor for digitizing the sensed voltage, and the signal processor comprises a digital signal processor coupled to the analog-to-digital converter for determining the secondary voltage from the digitized voltage.

16. The flicker controller according to claim 15, wherein the microcontroller includes a memory for storing conduction angle values therein for delaying the gating signals in accordance with the conduction angle values, and the microcontroller addresses the conduction angle values in the memory by applying index values as address inputs to the memory, the index values being derived from the determined secondary voltage.

17. The flicker controller according to claim 16, wherein the conduction angle values are pre-calculated to maintain a total current through the arc furnace substantially constant over a range of secondary voltage.

18. The flicker controller according to claim 17, wherein the range of secondary voltage extends between 30% and 70% of open circuit secondary voltage.

19. The flicker controller according to claim 1, wherein the switch comprises a plurality of thyristors arranged in opposite polarity to each other.

20. The flicker controller according to claim 1, wherein the electrode comprises three arc furnace electrodes, the power source includes three phases, and the switch comprises three sets of thyristors, each said thyristor set comprising a plurality of thyristors arranged in opposite polarity to each other and being electrically connected between a respective one the phases and a respective one of the arc furnace electrodes.

21. An AC electric arc furnace comprising:

a container for receiving metal;

an electrode spaced apart from the container, the electrode and the container including inputs for coupling to an AC power source for generating an electric discharge from the electrode; and a flicker controller for reducing flicker induced in the power source, the flicker controller comprising a switch electrically connected in series with the power source and the electrode and including a gating input for controlling the application of AC power to the electrode, a reactive element electrically coupled between the power source and the electrode for providing a reactive current path between the power source and the electrode independent of a conductive state of the switch, and a control system for applying gating signals to the gating input for maintaining a magnitude of reactive current flow through the electrode substantially constant.

22. The arc furnace according to claim 21, wherein the reactive element is selected such that the reactive current drawn by the reactive element when the electrode is short circuited to ground and the switch is in a non-conductive one of the states has a maximum value equal to the reactive current drawn by the arc furnace at full load while the discharge is established and the switch is in a fully conductive one of the states.

23. The arc furnace according to claim 21, wherein the gating signals are applied to the gating input to maintain a total current through the arc furnace substantially constant over a range of electrode voltage.

24. The arc furnace according to claim 23, wherein the range of electrode voltage extends between 30% and 70% of open circuit electrode voltage.

25. The arc furnace according to claim 21, wherein the flicker controller includes a resistive element coupled to the power source and the electrode for retarding a flow of real current through the arc furnace when the switch is in a non-conductive state.

26. A real power fluctuation controller for controlling changes in real power demand imposed on a power source when a switched load is coupled to and uncoupled from the power source, the real power retarding circuit comprising:

a switch electrically connect in series with the power source and the load, the switch including a gating input for controlling a conduction interval of the switch;

a resistive element coupled in parallel with the switch for retarding a flow of real current drawn by the load when the switch is in a non-conductive state; and a control system for applying signals to the gating input for controlling a magnitude of current drawn by the load.

27. The real power fluctuation controller according to claim 26, wherein the resistive element is coupled across the switch through a transformer for reducing a voltage rating of the resistive element.

* * * * *